(12) United States Patent
Crandall et al.

(10) Patent No.: US 7,751,475 B1
(45) Date of Patent: Jul. 6, 2010

(54) ARBITRARY-RESOLUTION, EXTREME-QUALITY VIDEO CODEC

(75) Inventors: Richard E Crandall, Portland, OR (US); Evan T Jones, Portland, OR (US); Jason Klivington, Portland, OR (US); David Kramer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1204 days.

(21) Appl. No.: 10/875,058

(22) Filed: Jun. 22, 2004

(51) Int. Cl.
*H04N 7/12* (2006.01)
*H04N 11/02* (2006.01)

(52) U.S. Cl. .............................. 375/240.03; 375/240.19

(58) Field of Classification Search ................................ 375/240.01–240.07, 240.12–240.16, 240.26
See application file for complete search history.

(56) References Cited

U.S. PATENT DOCUMENTS

| | | | |
|---|---|---|---|
| 5,812,788 A * | 9/1998 | Agarwal | 709/247 |
| 6,091,777 A * | 7/2000 | Guetz et al. | 375/240.11 |
| 6,137,533 A | 10/2000 | Azim | |
| 6,486,504 B1 | 11/2002 | Guidash | |
| 6,549,235 B1 | 4/2003 | Fossum et al. | |
| 6,678,419 B1 * | 1/2004 | Malvar | 382/240 |
| 6,717,987 B1 * | 4/2004 | Scarpino et al. | 375/240.03 |
| 6,801,665 B1 * | 10/2004 | Atsumi et al. | 382/239 |
| 6,898,322 B2 * | 5/2005 | Semasa | 382/238 |
| 7,085,436 B2 * | 8/2006 | Akhan et al. | 382/298 |
| 7,174,046 B2 * | 2/2007 | Okada | 382/239 |

FOREIGN PATENT DOCUMENTS

EP 1206119 A2 5/2002

OTHER PUBLICATIONS

Crandall, R. E. and Klivington, J. 1999, Vector implementation of multiprecision arithmetic, Advanced Computation Group, Apple Computer (Oct. 25), pp. 1-15.
Crandall, R. E. 2000, PowerPC G4 for Engineering, Science, and Education, Advanced Computation Group, Apple Computer, pp. 1-12.
JJ2000, An Introduction to JJ2000 Software, Tutorials, pp. 1-12, http://jj2000.epfl.ch/jj_tutorials/jj2000/index.html, visited Aug. 21, 2003.

(Continued)

*Primary Examiner*—David Czekaj
(74) *Attorney, Agent, or Firm*—Fenwick & West LLP

(57) ABSTRACT

Image data to be compressed is first converted from the RGB domain into a gamma-powered YUV domain. A wavelet transform then separates image data into high- and low-detail sectors, incorporating a dynamic scaling method, allowing for optimal resolution. The output data from the wavelet transform is then quantized according to an entropy-prediction algorithm that tightly controls the final size of the processed image. An adaptive Golomb engine compresses the data using an adaptive form of Golomb encoding in which mean values are variable across the data. Using variable mean values reduces the deleterious effects found in conventional Golomb encoding in which localized regions of similar data are inefficiently coded if their bit values are uncommon in the data as a whole. Inverse functions are applied to uncompress the image, and a fractal dithering engine can additionally be applied to display an image on a display of lower color depth.

28 Claims, 5 Drawing Sheets

OTHER PUBLICATIONS

A. Kiely and M. Klimesh, "Generalized Golomb Codes and Adaptive Coding of Wavelet-Transformed Image Subbands" IPN Progress Report 42-154, Apr. 15, 2003, pp. 1-12.

Nasir Memom and Xiaolin Wu, "Recent Developments in Context-Based Predictive Techniques for Lossless Image Compression," The Computer Journal, vol. 40, No. 2/3, 1997, pp. 127-136.

Giovanni Motta, et al. "Lossless Image Coding via Adaptive Linear Prediction and Classification," Proceedings of the IEEE, vol. 88, No. 11, Nov. 2000, pp. 1790-1796.

Shantanu D. Rane and Guillermo Sapiro "Evaluation of JPEG-LS, the New Lossless and Controlled-Lossy Still Image Compression Standard, for Compression of High-Resolution Elevation Data," IEEE Transactions of Geoscience and Remote Sensing, vol. 39, No. 10, Oct. 2001, pp. 2298-2306.

M. Weinberger, G. Seroussi, G. Sapiro, "The LOCO-I Lossless Image Compression Algorithm: Principles and Standardization into JPEG-LS", Hewlett-Packard Laboratories Technical Report No. HPL-98-193R1, Nov. 1998, revised Oct. 1999. *IEEE Trans. Image Processing*, vol. 9, Aug. 2000, pp. 1309-1324.

* cited by examiner

ARBITRARY-RESOLUTION, EXTREME-QUALITY VIDEO CODEC

CROSS-REFERENCE TO RELATED APPLICATIONS

This application is related to U.S. patent application Ser. No. 10/826,927, filed on Apr. 16, 2004, which is incorporated by reference herein in its entirety.

This application is also related to U.S. patent application Ser. No. 10/874,796 to Crandall et al, filed on Jun. 22, 2004 and entitled "Fractal-Dithering Technique for Image Display," also incorporated by reference herein in its entirety.

BACKGROUND

1. Field of the Invention

The present invention is related to the encoding of video streams. In particular, the present invention is directed to a high quality wavelet video codec.

2. Description of the Related Art

There is a need in the art for a way to achieve full screen real-time playback of high quality movies using a conventional desktop computer system. Although conventional methods have attempted to satisfy this need, they have been largely unsuccessful for a variety of reasons.

One conventional method for providing video playback is by transforming the video signal from the configuration domain into the frequency domain. Frequency-domain video compression is used in such standards as MPEG-2, MPEG-4, Windows Media, etc. Furthermore, most frequency-domain techniques also involve motion vectors to give further compression in the time domain by keying off of a key frame with a motion vector. Such a process makes random access to frames a time-intensive process, making it difficult to do video editing, also known as "scrubbing", in which a user should be able to quickly advance forward and backward through the video.

An alternative conventional solution is to encode a video stream according to a standard optimized for still images, such as the JPEG standard. However, single frame encoding algorithms are not typically fast enough to be displayed at real-time rates such as 24-frames per second. In addition, because of differences from one frame to the next, artifacts such as boiling and shimmering can occur. Entities (humans, cartoons, etc.) appearing against a background such as a textured wall are particularly disposed to these effects. And, while wavelet technology with a compression-ratio goal of about 1 bit per pixel—at least for still-frame applications—has been around since the 1980s, it has achieved such ratios only for playback at insufficient quality. Wavlet compression of high-quality video has remained elusive to date.

Accordingly, there is a need for a system and method for encoding video that yields very high quality images while smoothly playing at full video speeds.

SUMMARY OF THE INVENTION

The present invention provides a system and method for encoding video that yields very high quality images while smoothly playing at full video speeds. Image data is first converted by the present invention from the RGB domain into a gamma-powered YUV domain. A wavelet transform then separates image data into high- and low-detail sectors, incorporating a dynamic scaling method, which allows for optimal resolution, i.e. an optimal number of bits in wavelet results, per-sector, and enhances the resolution of all sectors. The output data from the wavelet transform is then quantized according to an entropy-prediction algorithm that tightly controls the final size of the processed image. An adaptive Golomb engine next performs a compression step, using an adaptive form of Golomb encoding in which mean values are variable across the data. The use of variable mean values reduces the deleterious effects found in conventional Golomb encoding in which localized regions of similar data are inefficiently coded if their bit values are uncommon in the data as a whole.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
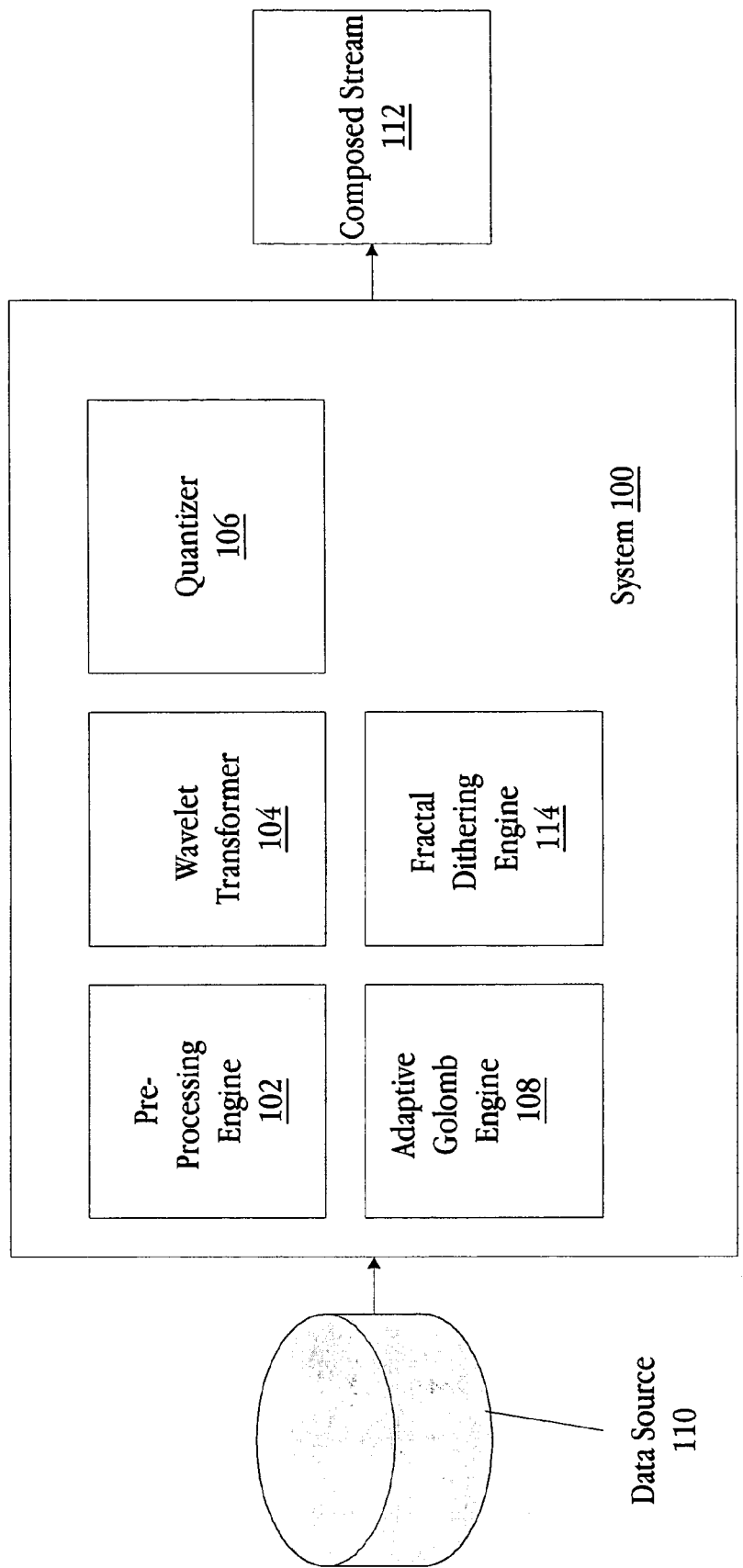
FIG. 1 is a block diagram of a system in accordance with an embodiment of the present invention.

FIG. 1 illustrates a block diagram of a system in accordance with an embodiment of the present invention. FIG. 1 includes a pre-processing engine 102, a wavelet transform 104, a quantizer 106, an adaptive Golomb engine 108, and a fractal dithering engine 114. Also illustrated in FIG. 1 are a data source 110, and a composed stream 112.

Figure 2:
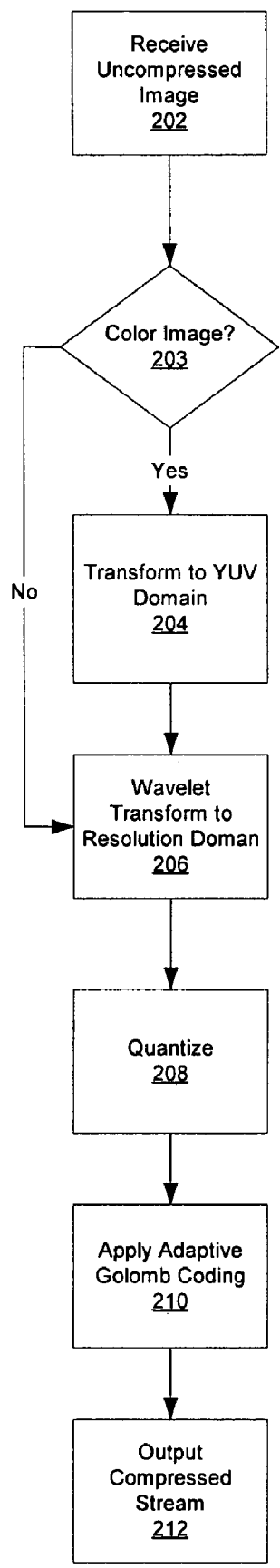
FIG. 2 is a flow chart illustrating a method for compressing video in accordance with an embodiment of the present invention.

Referring both to FIG. 1 and FIG. 2, the uncompressed data from data source 110 is transmitted to system 100 and received 202 by pre-processing engine 102. If the data includes 203 color data, pre-processing engine 102 transforms 204 the data in a manner as described below. After the data has been transformed by pre-processing engine 102, if applicable, or else after it is received 202, it is passed to wavelet transform 104, which transforms 206 original pixel data into the resolution domain using coefficients that are dynamically selected for the wavelet transform to maximize dynamic range of the wavelet values. Wavelet transform 104 then passes the processed data to quantizer 106, which performs 208 a quantization as described below. The result of the quantization is then provided to adaptive Golomb engine 108. Adaptive Golomb engine 108 performs 210 a compression, as described below with respect to FIG. 5, and outputs 212 a compressed stream of data. Composed stream 110 can then be output to a storage device, transmitted to a remote location, etc.

Pre-Processing Engine

In a preferred embodiment, pre-processing engine 102 transforms an original, 48-bit RGB image into the YUV domain, with the U, V channels each sub-sampled 2-by-2 to obtain an image in YUV420 format, and in which the Y channel is gamma-powered, i.e. $Y \rightarrow Y' := Y^\gamma$. This transformation reduces artifacts in dark regions that would otherwise be objectionable. Taking $\gamma = \frac{1}{2}$, for example, allows higher resolution for the dark regions. The sub-sampling effectively provides 24 bits per pixel for the triples (Y', U, V), resulting in an initial gain of 2:1 over a 48-bit original image. As is known by those of skill in the art, U, V sub-sampling is typically undetectable to the human eye—and even more so when motion is involved. Once transformed by pre-processing engine 102, the data stream is then passed to wavelet transform 104.

Wavelet Transform

Figure 3:
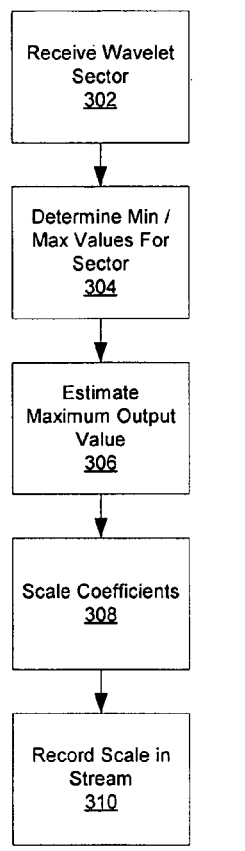
FIG. 3 is a flow chart illustrating dynamic scaling in a wavelet transform in accordance with an embodiment of the present invention.

The Y'UV data with Y' as the gamma-warped value $Y^\gamma$ is then wavelet-transformed by wavelet transform 104. As is known in the art, a wavelet transform is a mathematical way of separating high frequency data from lower frequency data. For example, in one embodiment the Burt 5/7 biorthogonal wavelet is employed. In addition to the conventional aspect of the wavelet transform, wavelet transform 104 additionally employs dynamic scaling. Referring now to FIG. 3, dynamic scaling according to the present invention is a method whereby the wavelet coefficients are changed as wavelet sectors are processed. In particular, for every received stage of the forward wavelet 302, minimum and maximum values of the input data are gathered 304. Based on these minimum and maximum values and the coefficients used in the unscaled Burt 5/7 transform, wavelet transform 104 estimates 306 the maximum possible resulting output values of the transform and scales 308 the wavelet coefficients such that the output values will make use of the full dynamic range of 16-bit fixed-point values without saturation. The scaling factor for each stage is recorded 310 in the encoded stream, so that the inverse wavelet stages can reverse this scaling.

The dynamic scaling method of the present invention allows for optimal resolution, i.e. an optimal number of bits in wavelet results, per-sector, and enhances the resolution of all sectors. In particular, the scalar sector of the wavelet-transformed image preferably has an optimal resolution This in turn helps to minimize the boiling effect described above that plagues many conventional wavelet codecs.

After the data stream has been transformed by wavelet transform 104, it is passed to the quantizer 106.

Quantizer

Following transformation by wavelet transform 104, each non-scalar sector of the wavelet preferably has a statistic that is Laplacian, i.e. enjoys a probability density in (bipolar) wavelet values w such that:

$$f(w) \approx \frac{1}{2m} e^{-|w|/m},$$

and so with absolute-mean $\langle |w| \rangle = m$. Quantizer 106 quantizes in a standard fashion (see [Taubman and Marcellin 2001] for variants for basic quantization of transform values), except that for removal of boiling artifacts and of non-local perturbations (where some part of a movie display affects remote parts), quantizer 106 does not quantize the scalar sector. The scalar sector is run through a standard predictor-corrector and the resulting data is then compressed by adaptive Golomb engine 108, losslessly, which enhances movie quality by reducing such artifacts as shimmering and boiling and nonlocality problems.

In quantizing a wavelet value w by a quantization integer q, quantizer 106 preferably adds $$\frac{q}{2}$$

to w before quantization, so that the maximal reconstruction error is $$\pm \frac{q}{2}.$$

Specifically, a wavelet w becomes $$w' = \mathrm{trunc}\left(\frac{w + \mathrm{sign}(w)\frac{q}{2}}{q}\right).$$

The result of this quantization is a beaded Laplacian density for nonscalar sectors.

Ratio Control

Ratio control allows a user to specify a compression ratio to quantizer 106 for a given input stream. Ratio control is preferably performed on a per-frame basis. In a preferred embodiment, a graph of ratio versus frame tends to show the specified ratio, with limited but reasonable excursions. In a preferred embodiment, a tri-modal solution including a one-pass encoder, a two-pass encoder, and a search encoder is run by quantizer 106 as follows.

One-pass encoder: Let m' denote the absolute-mean of quantized wavelet values w' for a given channel/sector. We use an estimation formula for the entropy E of a sector that is given a quantization integer q:

$$E(q) \approx at(q) + b\sqrt{\sqrt{m'(q)}}A$$

where t is the number of nonzero w' tokens in the sector, A is the pixel-area of the sector, and a,b are constants that are empirically determined according to the particular source material. In one embodiment, the constants are empirically determined by fitting optimally descriptive curves to sector-entropy measures of a series of frames from source material. This formula allows quantizer 106 to rapidly estimate E(q) for q running through a small set of powers of 2. In this way, quantizations $q = 2^k$ are actually tested to the point where t(q), m'(q) are computed and the sum of E over sectors is compared to the target entropy. Interpolation is then used as the desired q value for target ratio is between two powers of 2.

Figure 4A:
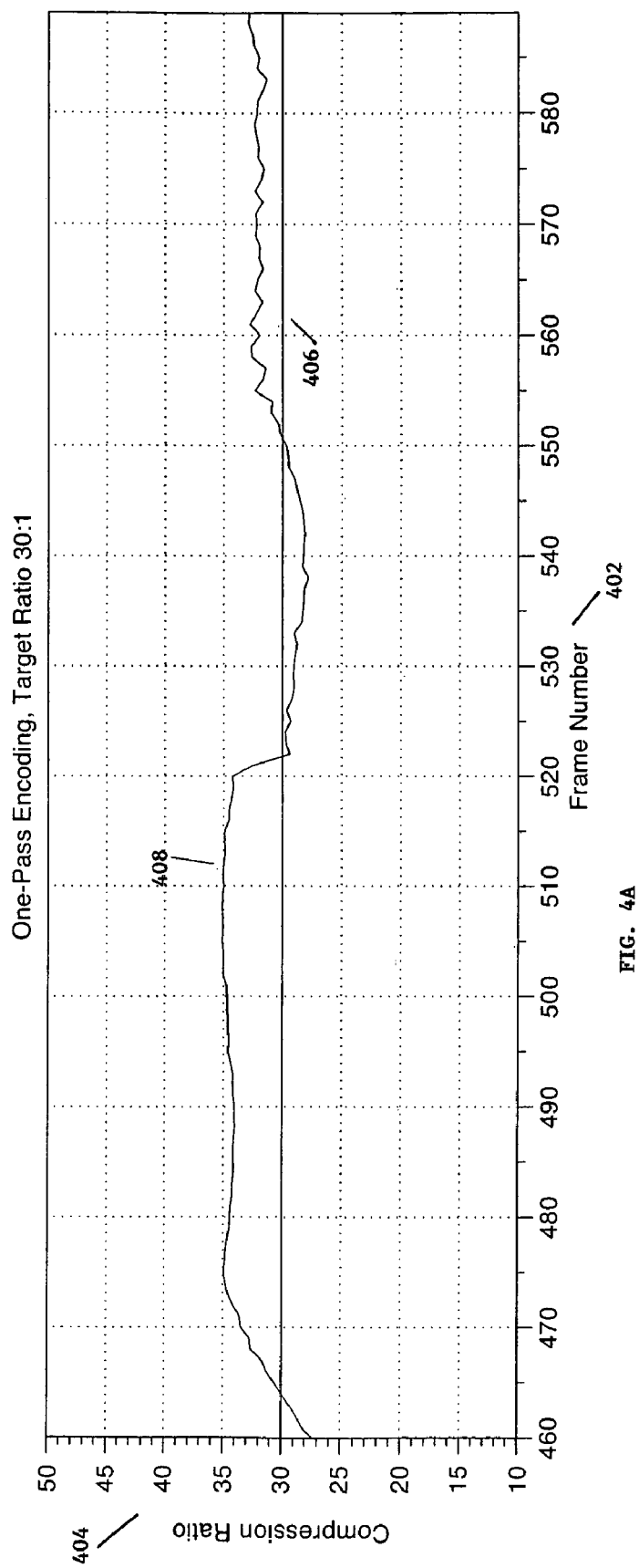
FIG. 4A is a graph illustrating a one-pass ratio versus time for a typical movie clip in accordance with an embodiment of the present invention.

An advantage of this one-pass method is that only one call to adaptive Golomb engine 108 is required. FIG. 4A illustrates a typical movie clip's one-pass ratio versus time. In FIG. 4A, frame numbers 402 are along the x-axis and compression ratios 404 are along the y-axis. The horizontal line 406 is the target ratio—to which every frame is ideally compressed. Line 408 connects data points, one at each frame number, showing the one-pass ratio for each image. Ideally, line 408 should hug the target ratio as closely as possible, meaning that there is fine control over compressed image sizes, which can be important for playing video—if a frame is too big it will take too long to decode and cause a stutter in video playback.

Figure 4B:
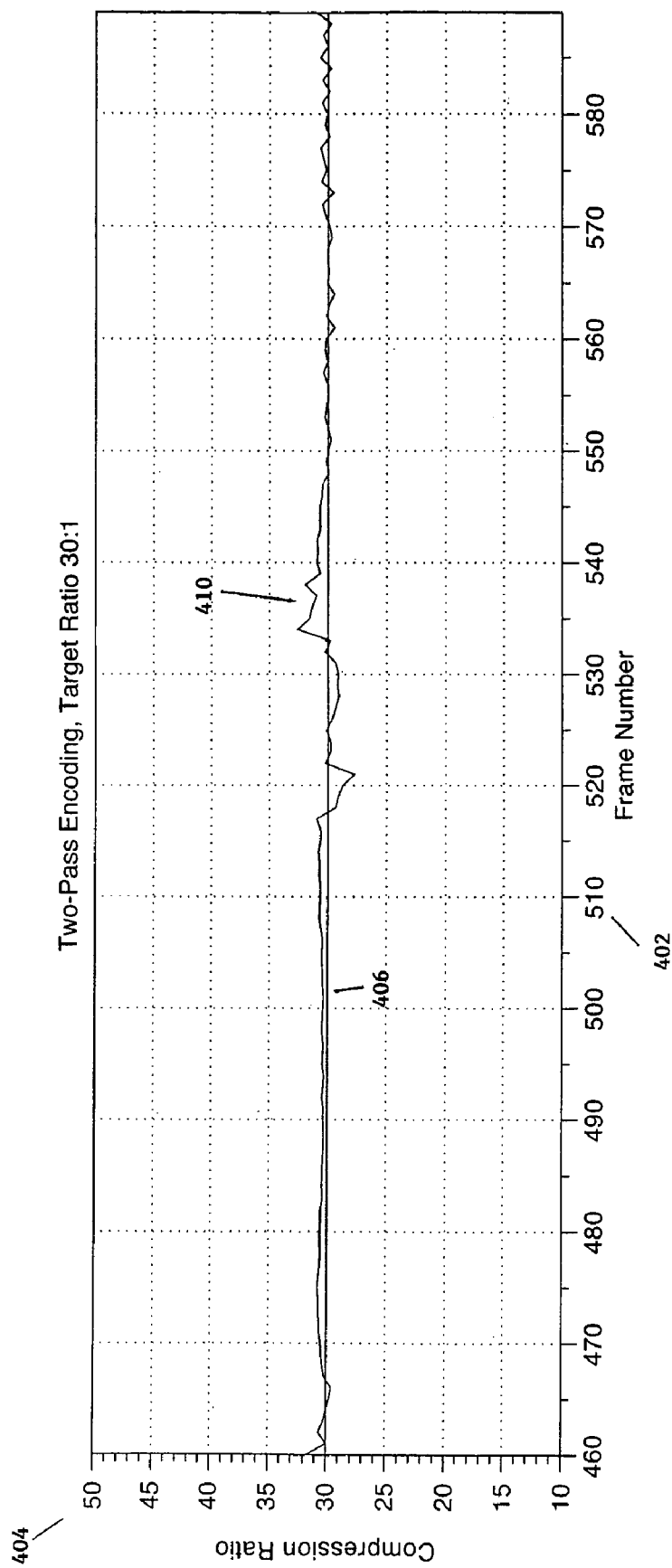
FIG. 4B is a graph illustrating a two-pass ratio versus time for a typical movie clip in accordance with an embodiment of the present invention.

In an alternative embodiment, a two-pass encoder is used for tighter ratio control. An initial pass is evaluated against the target ratio, and one interpolation for the quantizer 106 is then invoked for tight ratio estimate. If the target ratio is R and a 1-pass result is empirically $R_1$—that is, R1 is the ratio determined by the output of the adaptive Golomb engine—then quantizer 106 aims for a "phantom" ratio $R_2$ given by:

$$R_2 = \frac{R^2}{R_1},$$

in this way determining a new set of quantizer q values for a more accurate (i.e. closer to R target) ratio result. For example, assume the target ratio is 25 and the actual ratio after the first compression $R_1$ is 18.75. This means the ratio was only 75% as large as desired. The predictor therefore gets a new target of 33.333, which assumes that the second compression ratio will also be 75% of the target. Since 25 is 75% of 33.33, the new target will arrive approximately at the original target ratio. FIG. 4B illustrates an example of two-pass encoding, from which it can be seen that the second pass line c10 is closer to the target 406 than was the single-pass line 408 of FIG. 4A.

Adaptive Golomb Engine

The compressed image stream output from quantizer 106 is then provided as input to adaptive Golomb engine 108. A Golomb encoder is an efficient way to represent data having a Laplacian distribution, such as the data output from quantizer 106. Data encoded using a Golomb encoder typically has a format including both unary and binary components.

As is known in the art, Golomb coding involves representing the most frequently-occurring values using tokens having a small number of bits. This results in a form of compression, since the tokens generally will have fewer bits than the pixel values they replace. However, there can exist areas of an image in which there are a series of values having a magnitude very different from the most frequently-occurring values, and yet which repeat often within the local region. For example, if the pixel value "230" is not common overall in the image data, it will likely not be a value selected for large savings using a small token. However, it may be the case that there is a region of the image with many values of or near "230", even though the region is not large compared with the rest of the image. A conventional Golomb coding scheme sacrifices the extra bits used to repeat these values in order to achieve an overall satisfactory compression level. That is, if a token of fewer bits were used to express "230", more bits would be required for a different token, and the overall compression rate would decrease.

System 100 improves upon this conventional method using adaptive Golomb engine 108. Adaptive Golomb Engine (AG) 108 determines how many bits to use for a token based on a region more localized than the overall image. AG 108 determines a mean, which is preferably a weighted average of the most recent values encountered by the AG 108. For example, in one embodiment the previous ten values are considered. Because the mean is a moving average, if recent values have been close to, say, "230", then the mean will trend toward "230". On the other hand, if recent values have been closer to another value, e.g., "3", then the mean will trend toward "3". Because the mean is not fixed for an entire set of data, AG 108 therefore is able to achieve an optimal level of compression on a more local level than is achieved using non-adaptive Golomb coding.

Figure 5:
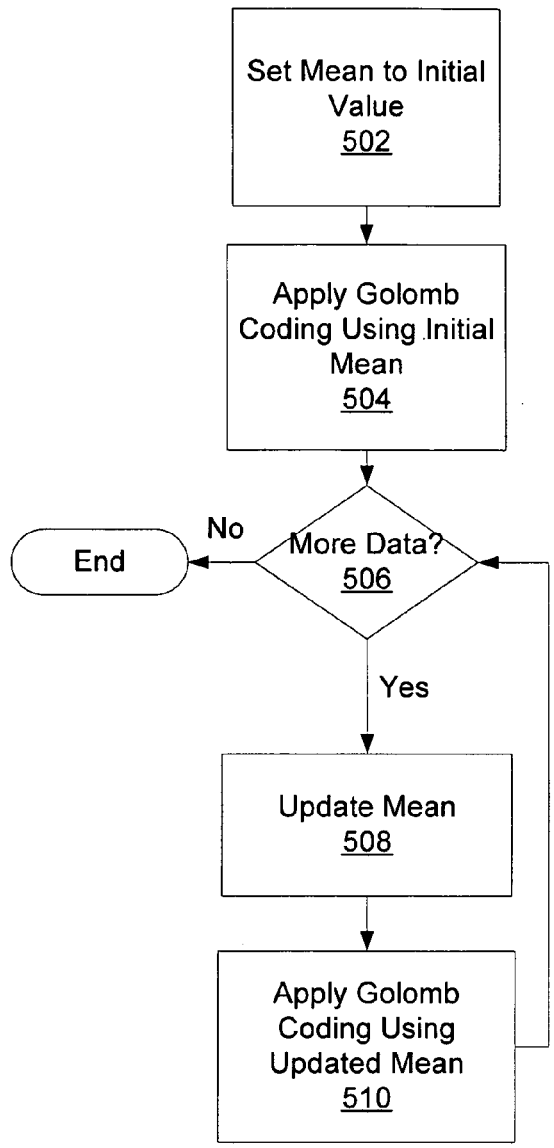
FIG. 5 is a flow chart illustrating operation of an adaptive Golomb engine in accordance with an embodiment of the present invention.

FIG. 5 illustrates a flow chart of the operation of adaptive Golomb engine 108. First, AG 108 sets (502) its mean to an initial value, which is preferably derived empirically. For example, in one embodiment the mean is 3. Next, AG 108 applies (504) the Golomb coding as described above to a pixel to be encoded. If (506) more pixels remain, then the mean is updated (508) to reflect a moving average of the most recent pixels, and the next pixel is encoded (510) using the updated mean. Once no more data (506) remains, the AG process terminates and outputs the stream of compressed data.

Decompression

Decoding of composed stream 112 proceeds generally according to the inverse of the above functions. The adaptive Golomb Engine 108 decodes the composed stream 112 by tracking the mean-update algebra for coherence. Quantizer 106 reverses the quantization previously performed (though some data is lost by virtue of the quantization function), and wavelet transform 104 performs the inverse wavelet transformation using the dynamic-scaling algebra applied in the original transformation. Pre-processing Engine 102 obtains Y from the equation $Y=(Y')^{1/\gamma}$, and the reconstruction of a facsimile of the original RGB is thus obtained by standard means of U, V supersampling. The uncompressed image is next passed to fractal dithering engine 114 for dithering.

Fractal Dithering Engine

The Fractal Dithering Engine 114 allows 48-bit RGB to be displayed on a 24-bit monitor—more precisely, a conventional monitor expecting 24-bit input—for many monitors do not actually realize the full 24-bit color dynamic). In this algorithm, a triple $(R,G,B)=(2^8R_u+R_l,2^8G_u+G_l,2^8B_u+B_l),$ where each upper (u) and lower (l) component is a byte, is transformed in a spatially-deterministic fashion to a displayed triple $(R',G',B')=(F(R_u,R_l,x,y),F(G_u,G_l,x,y),F(B_u,B_l,x,y).$ Here, F is a fractal-dither function. Note that if the function F were just the degenerate form $F(C_u, C_l, x, y)=C_u$, then we would simply be truncating the 48-bit RGB to the high byte, for display. But a preferred embodiment takes account of $C_l$ and the spatial coordinates (x, y). This technique removes essentially all banding attendant on the limitations of 24-bit resolution. The Fractal Dithering Engine 114 is described in detail in United States patent application Ser. No. 10/874,796, entitled Fractal-Dithering Technique for Image Display, to Crandall et al., filed on Jun. 22, 2004, commonly assigned, and incorporated herein by reference in its entirety.

The uncompressed, dithered image is then ready for output to a display screen or other output device.

Vectorization

In one embodiment, many steps of the encode and decode process described above benefit from Streaming Single-Instruction-Multiple-Data (SIMD) vectorization. In particular, color space conversion, wavelet transforms, and quantization are well suited to vector implementations. Because memory bandwidth is a relevant concern in optimizing a high-definition, high-quality codec, it is preferable that as much processing as possible be done per pass through the data, to minimize the per-frame memory bandwidth requirements.

In one embodiment, the initial color space conversion performed by pre-processing engine 102 is vectorized, and includes not only the color space conversion, but also the nonlinear gamma adjustment of the Y channel. It also reports the minimum and maximum output of each channel, which can then be used to calculate the dynamically scaled wavelet coefficients for the first stage of the wavelet transform by wavelet transform 104. While doing the wavelet transform, maximum and minimum output values are collected, so that the successive wavelet stage's dynamic coefficients can be calculated in turn. The forward wavelet pass is in one embodiment implemented using floating-point arithmetic. Though this is slower than a fixed-point implementation (as it requires conversion from fixed point to floating point and back, and only allows four elements per vector for wavelet algebra) it provides higher precision in the resulting encoded data. As speed is important in decode and playback, the inverse wavelet transform is preferably implemented using fixed-point arithmetic. Quantization is done in a separate pass of the data, and is preferably implemented using a SIMD floating-point reciprocal multiply. In decoding, the dequantization stage is in one embodiment included in the adaptive-Golomb decode operation, as it only adds a few simple arithmetic instructions to the decode process. Optimization of the color space conversion on decode in one embodiment takes advantage of SIMD vectorization, and includes inverse gamma correction of the Y channel, as well as the fractal dither of the RGB output channels.

In one embodiment, the wavelet transform is not implemented as an in-place transform, so the transform is typically either out-of-place, or requires the use of a temporary buffer. For a two-dimensional transform, we have eliminated the need for temporary buffers and unnecessary copying of the source or output data. We allocate buffers for each of the YUV planes that accommodate an extra row and extra processing column. A processing column preferably includes 128-bit vectors (8 16-bit elements), whereas a scalar implementation would use a single column of singleton elements. Original YUV data is offset one row and one processing column from the origin. In the horizontal stage of the wavelet transform, the output of each row is offset up by one row and left by one processing column, and thus avoids overwriting any existing data. The vertical transform in one embodiment starts from the rightmost processing column, and offsets the output down one row and right one processing column, again avoiding overwriting any needed data, and returning the transformed data to its original offset within the buffer. This offset technique is preferably employed for successive depths of the wavelet transform, and is preferably also applied to all stages of the inverse wavelet transform.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of the wavelet transformer 104, adaptive Golomb engine 108, and so forth may be provided in many or one module.

Some portions of the above description present the feature of the present invention in terms of algorithms and symbolic representations of operations on information. These algorithmic descriptions and representations are the means used by those skilled in the audio and graphics compression arts to most effectively convey the substance of their work to others skilled in the art. These operations, while described functionally or logically, are understood to be implemented by computer programs or hardware. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for compressing data, the method comprising:
   transforming the data from a first domain to a second domain;
   applying a wavelet transform to the data in the second domain to yield a plurality of wavelet coefficients;
   dynamically scaling the wavelet coefficients to yield wavelet transformed data, the wavelet transformed data comprising a scalar sector and a plurality of non-scalar sectors;
   quantizing only the non-scalar sectors of the wavelet transformed data;
   applying an adaptive Golomb coding function to the quantized data and the non-quantized data to yield compressed data; and
   outputting the compressed data.

2. The computer-implemented method of claim 1 wherein the first domain is an RGB domain and the second domain is a YUV domain.

3. The computer-implemented method of claim 2 wherein a Y channel of the image data in the YUV domain is gamma-powered that includes a nonlinear gamma adjustment of the Y channel.

4. The computer-implemented method of claim 1 wherein dynamically scaling wavelet coefficients further comprises:
   receiving a stage of a forward wavelet;
   determining a minimum and a maximum value of the data;
   estimating a maximum resulting output value of the wavelet transform; and
   scaling the wavelet coefficients responsive to the estimated output value.

5. The computer-implemented method of claim 1 wherein the wavelet transformed data of non-scalar sectors has a Laplacian distribution.

6. The computer-implemented method of claim 1 wherein the scalar sector is processed by a predictor-corrector function.

7. The computer-implemented method of claim 1 wherein quantizing the transformed data further comprises quantizing the transformed data according to a specified compression ratio.

8. The computer-implemented method of claim 7 wherein the compression ratio is applied to each frame.

9. The computer-implemented method of claim 1 further comprising uncompressing the compressed data by:
   applying an inverse Golomb coding function to the compressed data to obtain uncompressed quantized data;
   applying an inverse quantization to the uncompressed quantized data to obtain wavelet-transformed data;
   applying an inverse wavelet transform to obtain uncompressed data in the second domain;
   transforming the uncompressed data from the second domain to the first domain; and outputting the uncompressed data.

10. The computer-implemented method of claim 9 further comprising applying a fractal dithering function to the uncompressed data in the first domain prior to outputting the uncompressed data.

11. The computer-implemented method of claim 10 wherein the uncompressed data is output on a 48-bit virtual display.

12. The computer-implemented method of claim 1, wherein the adaptive Golomb coding function determines the number of bits to use for a token based on localized region characteristics.

13. The computer-implemented method of claim 12, wherein the adaptive Golomb coding function determines a mean by a weighted function of the most recent quantized data values processed by the adaptive Golomb coding function.

14. A system for compressing data, the system comprising:
   a pre-processing engine configured to receive data from a data source and transform the data from a first domain to a second domain;
   a wavelet transformer communicatively coupled to the pre-processing engine and configured to:
      apply a wavelet transform to the data in the second domain to yield a plurality of wavelet coefficients; and
      dynamically scale the wavelet coefficients to yield wavelet transformed data, the wavelet transformed data comprising a scalar sector and a plurality of non-scalar sectors;
   a quantizer communicatively coupled to the wavelet transformer and configured to quantize only the non-scalar sectors of the wavelet-transformed data; and
   an adaptive Golomb engine communicatively coupled to the quantizer and configured to compress the quantized data and the non-quantized data.

15. The system of claim 14 wherein the first domain is an RGB domain and the second domain is a YUV domain.

16. The system of claim 15 wherein a Y channel of the image data in the YUV domain is gamma-powered that includes a nonlinear gamma adjustment of the Y channel.

17. The system of claim 14 wherein the wavelet transformer further configured to:
   receive receiving a stage of a forward wavelet;
   determine a minimum and a maximum value of the data;
   estimate a maximum resulting output value of the wavelet transform; and
   scale the wavelet coefficients responsive to the estimated output value.

18. The system of claim 14 wherein the wavelet-transformed data of non-scalar sectors has a Laplacian distribution.

19. The system of claim 14 further comprising a predictor-corrector module that processes the scalar sector.

20. The system of claim 14 wherein the quantizer quantizes the transformed data according to a specified compression ratio.

21. The system of claim 20 wherein the compression ratio is applied to each frame.

22. The system of claim 14 wherein:
   the adaptive Golomb engine is further configured to apply an inverse Golomb coding function to the compressed data to obtain uncompressed quantized data;
   the quantizer is further configured to apply an inverse quantization to the uncompressed quantized data to obtain wavelet-transformed data;
   the wavelet transformer is further configured to apply an inverse wavelet transform to obtain uncompressed data in the second domain; and
   the pre-processing engine is further configured to transform the uncompressed data from the second domain to the first domain.

23. The system of claim 22 further comprising a fractal dithering engine, communicatively coupled to the pre-processing engine, for dithering an image from a higher color depth to a lower color depth.

24. The system of claim 14, wherein the adaptive Golomb engine determines the number of bits to use for a token based on localized region characteristics.

25. The system method of claim 24, wherein the adaptive Golomb engine determines a mean by a weighted function of the most recent quantized data values encountered by the adaptive Golomb engine.

26. A computer program product for compressing data, the computer program product stored on a computer-readable medium and including instructions for causing a processor of a computer to execute the steps of:
- transforming the data from a first domain to a second domain;
- applying a wavelet transform to the data in the second domain to yield a plurality of wavelet coefficients;
- dynamically scaling the wavelet coefficients to yield wavelet transformed data, the wavelet transformed data comprising a scalar sector and a plurality of non-scalar sectors;
- quantizing only the non-scalar sectors of the wavelet transformed data;
- applying an adaptive Golomb coding function to the quantized data and the non-quantized data to yield compressed data; and
- outputting the compressed data.

27. The computer program product of claim 26, wherein the adaptive Golomb coding function determines the number of bits to use for a token based on localized region characteristics.

28. A system for compressing data, the system comprising:
- transforming means, for transforming the data from a first domain to a second domain;
- wavelet transforming means, communicatively coupled to the transforming means, for applying a wavelet transform to the data in the second domain to yield a plurality of wavelet coefficients, and for dynamically scaling the wavelet coefficients to yield wavelet transformed data, the wavelet transformed data comprising a scalar sector and a plurality of non-scalar sectors;
- quantizing means, communicatively coupled to the wavelet transforming means, for quantizing only the non-scalar sectors of the wavelet transformed data, wherein the scalar sector is not quantized;
- Golomb coding means, communicatively coupled to the quantizing means, for applying an adaptive Golomb coding function to the quantized data and the non-quantized data to yield compressed data; and
- outputting means, communicatively coupled to the Golomb coding means, for outputting the compressed data.

* * * * *

UNITED STATES PATENT AND TRADEMARK OFFICE
CERTIFICATE OF CORRECTION

| | | |
|---|---|---|
| PATENT NO. | : 7,751,475 B1 | Page 1 of 1 |
| APPLICATION NO. | : 10/875058 | |
| DATED | : July 6, 2010 | |
| INVENTOR(S) | : Richard E Crandall et al. | |

It is certified that error appears in the above-identified patent and that said Letters Patent is hereby corrected as shown below:

In column 1, line 51, delete "Wavlet" and insert -- Wavelet --, therefor.

In column 3, line 43, after "resolution" insert -- . --.

In column 4, line 20, after "wavelet" insert -- value --.

In column 10, line 39, in Claim 17, after "receive" delete "receiving".

Signed and Sealed this
Eighth Day of November, 2011

David J. Kappos
*Director of the United States Patent and Trademark Office*